(12) United States Patent
Chai et al.

(10) Patent No.: US 8,102,859 B2
(45) Date of Patent: Jan. 24, 2012

(54) METHOD, SYSTEM, AND DEVICE FOR NETWORK SELECTION

(75) Inventors: Xiaoqian Chai, Shenzhen (CN); Shouling Cui, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/110,530

(22) Filed: May 18, 2011

(65) Prior Publication Data

US 2011/0211567 A1 Sep. 1, 2011

Related U.S. Application Data

(63) Continuation of application No. 12/957,120, filed on Nov. 30, 2010, which is a continuation of application No. PCT/CN2009/071962, filed on May 25, 2009.

(30) Foreign Application Priority Data

May 31, 2008 (CN) .......................... 2008 1 0109871

(51) Int. Cl.
*H04L 12/56* (2006.01)
(52) U.S. Cl. .................................. 370/395.42
(58) Field of Classification Search .................. None
See application file for complete search history.

(56) References Cited

U.S. PATENT DOCUMENTS

| | | |
|---|---|---|
| 5,903,832 A | 5/1999 | Seppanen et al. |
| 2007/0004405 A1 | 1/2007 | Buckley et al. |
| 2007/0191006 A1 | 8/2007 | Carpenter |
| 2007/0254646 A1 | 11/2007 | Sokondar |
| 2007/0294385 A1 | 12/2007 | Kapadekar et al. |
| 2008/0064393 A1* | 3/2008 | Oommen et al. .......... 455/432.1 |
| 2008/0096548 A1 | 4/2008 | Buckley et al. |
| 2008/0096559 A1 | 4/2008 | Phillips et al. |

(Continued)

FOREIGN PATENT DOCUMENTS

CA 2 589 961 11/2007

(Continued)

OTHER PUBLICATIONS

Open Mobile Alliance, "OMA Device Management Bootstrap," Approved Version 1.2, OMA-TS-DM_Bootstrap-V1_2-20070209-A, 28 pages, Feb. 9, 2007.

(Continued)

*Primary Examiner* — Chirag Shah
*Assistant Examiner* — Yong Zhou
(74) *Attorney, Agent, or Firm* — Slater & Matsil, L.L.P.

(57) ABSTRACT

A method, system, and device for network selection are provided. The method for network selection includes the following steps. After network selection is triggered, a network selection list stored in a Universal Integrated Circuit Card (UICC) and a network selection list stored in a Mobile Equipment (ME) are read, where the UICC is embedded in the ME and accessible to the ME. Network selection is performed according to the network selection list stored in the UICC and the network selection list stored in the ME. Also, a method for network selection through a network selection policy is added and methods for implementing a type and a data structure of a network selection policy as well as a method for network selection based on a network selection policy are provided, so that network selection can be controlled more flexibly, a terminal can locate a target network faster, and time consumed for the network selection is reduced.

4 Claims, 10 Drawing Sheets

U.S. PATENT DOCUMENTS

2008/0102833 A1* 5/2008 Buckley ............... 455/435.2

FOREIGN PATENT DOCUMENTS

| CN | 1568074 A | 1/2005 |
|---|---|---|
| CN | 1708153 A | 12/2005 |
| CN | 1957634 A | 5/2007 |
| CN | 101064964 A | 10/2007 |
| CN | 101068410 A | 11/2007 |
| CN | 101374295 A | 2/2009 |
| EP | 1 850 617 A1 | 10/2007 |
| EP | 1 863 313 A1 | 12/2007 |
| WO | WO 97/30541 | 8/1997 |
| WO | WO 2005/067334 A1 | 7/2005 |
| WO | WO 2006/133720 A1 | 12/2006 |
| WO | WO 2008/025618 A1 | 3/2008 |

OTHER PUBLICATIONS

3GPP TSG-SA WG1 Meeting #39, Change Request, S1-080024, 22.234 CR 0030, V 8.1.0, Puerto Vallarta, Mexico, 6 pages, Jan. 28-Feb. 1, 2008.

3GPP TS 22.011 V8.3.0 (Mar. 2008), "3$^{rd}$ Generation Partnership Project; Technical Specification Group Services and System Aspects; Service accessibility (Release 8)," 26 pages, Mar. 2008.

3GPP TS 23.122 V8.1.0 (Mar. 2008), "3$^{rd}$ Generation Partnership Project; Technical Specification Group Core Network and Terminals; Non-Access-Stratum (NAS) functions related to Mobile Station (MS) in idle mode (Release 8)," 35 pages, Mar. 2008.

3GPP TS 23.402 V8.1.1 (Mar. 2008), "3$^{rd}$ Generation Partnership Project; Technical Specification Group Services and System Aspects; Architecture enhancements for non-3GPP accesses (Release 8)," 163 pages, Mar. 2008.

3GPP TS 24.302 V0.4.0 (May 2008), "3$^{rd}$ Generation Partnership Project; Technical Specification Group Core Network and Terminals; Access to the 3GPP Evolved Packet Core (EPC) via non-3GPP access networks; Stage 3; (Release 8)," 24 pages, May 2008.

Written Opinion of the International Searching Authority, PCT/CN2009/071962, dated Sep. 10, 2009, 4 pages.

Extended European Search Report, Applicant Huawei Technologies Co., Ltd., Application No./Patent No. 09753479.6-2413/2276294 PCT/CN2009/071962, dated Apr. 15, 2011, 9 pages.

International Search Report, PCT/CN2009/071962, dated Sep. 10, 2009, 4 pages.

3GPP TS 23.122 V9.2.0 (Mar. 2010), "3$^{rd}$ Generation Partnership Project; Technical Specification Group Core Network and Terminals; Non-Access-Stratum (NAS) functions related to Mobile Station (MS) in idle mode (Release 9)," Mar. 2010, 41 pages.

Chinese Office Action, Application No. 200810109871.1, dated Jul. 25, 2011, 14 pages.

* cited by examiner

METHOD, SYSTEM, AND DEVICE FOR NETWORK SELECTION

This application is a continuation of U.S. patent application Ser. No. 12/957,120, filed on Nov. 30, 2010, which is a continuation of International Application No. PCT/CN2009/071962, filed on May 25, 2009, and which claims priority to Chinese Patent Application No. 200810109871.1, filed on May 31, 2008, each of which is incorporated herein by reference in its entirety.

TECHNICAL FIELD

The present invention relates to the field of communications technologies, and more particularly to a method, system, and device for network selection.

BACKGROUND OF THE INVENTION

With the development of communications technologies, the Wireless Fidelity (WiFi) and the World Interoperability for Microwave Access (WiMAX) develop very fast. These technologies are beneficial supplements to the 3rd Generation (3G) mobile communication. Currently, the Wireless Local Area Network (WLAN) and the Wireless Metropolitan Area Network (WMAN) already start to be used. In the process of their promotion, the terminals play a very important role. At present, there are more and more mobile phone terminals that integrate 3G and WLAN functions. For an operator, effectively controlling a terminal to automatically access different networks in specific conditions can reduce costs for users and operators greatly and improve user experiences.

A method for network selection provided in the prior art mainly includes the following steps. Some network selection lists such as an Equivalent Home Public Land Mobile Network (EHPLMN) list, a Home Public Land Mobile Network (HPLMN) list, a User Controlled PLMN Selector with Access Technology list, an Operator Controlled PLMN Selector with Access Technology list, and Forbidden PLMNs are stored in a Subscriber Identity Module (SIM)/Universal Mobile Telecommunication System SIM (USIM) in a Universal Integrated Circuit Card (UICC). Subsequently, network selection is performed according to a certain algorithm. The method for network selection includes automatic network selection and manual network selection.

In the process of implementing the present invention, the inventors find that the existing network selection process has at least the following deficiencies.

(1) In the prior art, the network selection lists are stored in the UICC, which results in that a server is unable to update list contents flexibly enough.

(2) The existing network selection lists available in the UICC are incomplete. For example, no WLANForbiddenList exists, and network selection in scenarios of access technologies such as WLAN cannot be solved.

(3) In the prior art, network selection and configuration is mainly performed according to priorities, network selection policies cannot be configured and used, and location of network selection is performed through level-by-level selection of the lists, so the network selection speed is low.

SUMMARY OF THE INVENTION

The present invention is directed to a method, a system, and a device for network selection, so as to realize that network selection lists are stored in a Universal Integrated Circuit Card (UICC) and a Mobile Equipment (ME) at the same time, and that network selection is accomplished in cooperation.

In an embodiment, the present invention provides a method for network selection, where the method includes the following steps.

After network selection is triggered, a network selection list stored in a UICC and a network selection list stored in an ME are read. The UICC accesses the ME and is accessible to the ME.

Network selection is performed according to the network selection list stored in the UICC and the network selection list stored in the ME.

In an embodiment, the present invention further provides an ME, including a network selection trigger module, a reading module, and a network selection module.

The network selection trigger module is adapted to trigger network selection when a network selection trigger condition is satisfied.

The reading module is adapted to read a network selection list stored in a UICC and a network selection list stored in the ME, after the network selection trigger module triggers network selection.

The network selection module is adapted to perform network selection according to the network selection lists read by the reading module.

In an embodiment, the present invention further provides a method for network selection, where the method includes the following steps.

It is detected whether a network selection policy trigger condition is satisfied.

When the network selection policy trigger condition is satisfied, network selection is performed according to the network selection policy.

Alternatively, when no network can be selected according to the network selection policy, a network selection list stored in a UICC is read to perform network selection, or the network selection list stored in the UICC and a network selection list stored in a DM tree of an ME are read to perform network selection.

Compared with the prior art, the embodiments of the present invention have the following advantages. In the embodiments of the present invention, primarily the UICC stores a list related to network selection, and secondarily the ME stores a list related to the network selection, so as to provide a method for network selection accomplished with the UICC and ME in cooperation. Also, a method for network selection according to a network selection policy is additionally provided, and methods for implementing a type and a data structure of a network selection policy as well as a method for network selection based on the network selection policy are provided, so that the network selection can be controlled more flexibly, a terminal can locate a target network faster, and time consumed for network selection is reduced.

DETAILED DESCRIPTION OF ILLUSTRATIVE EMBODIMENTS

As a mobile terminal becomes more complex and supports more services, the demand for managing and configuring the terminal in the Over the Air (OTA) mode becomes increasingly stronger. In order to manage a mobile terminal in the OTA mode, the Open Mobile Alliances (OMA) develops the device management (DM) protocol, which mainly provides a set of session-based communication mechanisms between a management server and managed terminals. The DM protocol includes a session management mechanism, session security management, management message format and constraint in a management session, and a data model. In order to implement specific management functions towards a terminal, on the basis of the DM protocol, an application data model, that is, a management object (MO), is developed, such as a firmware update MO (FUMO) and a software component MO (SCOMO).

Terminal equipment that supports OMA DM service functions must have a DM client in charge of OMA DM protocol parsing, session management, and session security. The equipment that supports OMA DM service functions should also include a DM tree, which organizes all usable MOs in the equipment together. Each node in the DM tree has a unique Uniform Resource Identifier (URI) for location. Each node has an access control list (ACL) attribute for controlling the access right of the DM server for the attribute or value of the node (in some cases, sub-node attributes are further included).

When having the access right, the DM server can send related management commands such as Get, Add, Replace, Exec, and Delete to a node in a DM tree through the OMA DM protocol. The DM server can manage the terminal equipment by sending management commands to the node in the DM tree.

In an embodiment, the present invention provides a method for network selection. Primarily, a Universal Integrated Circuit Card (UICC) stores a network selection list, and secondarily a mobile equipment (ME) stores a network selection list, so that a method for network selection accomplished with the UICC and ME in cooperation is provided. Also, according to the embodiments of the present invention, network lists of other access technologies are added, and methods for network selection after the network lists are added are provided. In addition, in the embodiments of the present invention, a method for network selection according to a network selection policy is additionally provided, and a type of the network selection policy and an implementation method for network selection as well as a method for network selection based on the network selection policy are provided.

Figure 1:
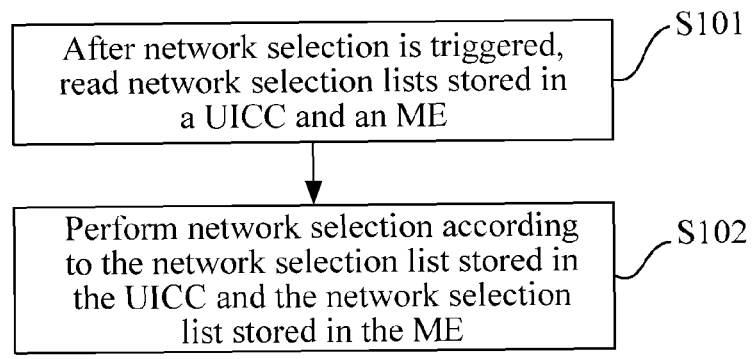
FIG. 1 is a flow chart of a method for network selection according to an embodiment of the present invention.

FIG. 1 is a flow chart of a method for network selection according to an embodiment of the present invention, where the method includes the following steps.

In step S101, after network selection is triggered, network selection lists stored in a UICC and an ME are read respectively. The UICC is embedded in the ME and is accessible to the ME. The network selection list stored in the UICC includes one or more of an Equivalent Home Public Land Mobile Network (EHPLMN) list, a Home Public Land Mobile Network (HPLMN) List, a User Controlled PLMN Selector with Access Technology list, an Operator Controlled PLMN Selector with Access Technology list, and Forbidden PLMNs. The network selection list stored in the ME includes one or more of a priority-based PLMNList, a priority-based Wireless Local Area Network (WLAN) list, a priority-based World Interoperability for Microwave Access (WiMAX) list, a WLANForbiddenList, and a WiMAXForbiddenList.

The network selection list stored in the ME is stored in the DM tree of the ME. The DM server can configure and update the network selection list through the DM protocol, for example, perform operations such as Add, Modify, and Delete on the network selection list.

In an embodiment of the present invention, the network selection list stored in the ME can be stored in the DM tree of the ME in the following two modes.

(1) The network selection list is encapsulated in a Bootstrap message and configured in the DM tree of the ME when the DM client performs Bootstrap configuration.

(2) The network selection list is configured in the DM tree of the ME through a DM command sent in a DM session.

In step S102, network selection is performed according to the network selection list stored in the UICC and the network selection list stored in the ME.

Specifically, the performing the network selection according to the read network selection lists stored in the UICC and ME may be as follows.

(1) Effective network selection lists indicated by an elementary file USIM service table ($EF_{UST}$) of a Subscriber Identity Module (SIM)/Universal Mobile Telecommunication System SIM (USIM) module in the UICC are read in sequence to perform network selection. The selected accessible network is not included in a forbidden list of the selection network.

Specifically, when the network selection is PLMN selection, the reading the effective network selection lists indicated by the $EF_{UST}$ of the SIM/USIM module in the UICC in sequence to perform network selection may be as follows.

When an EHPLMN exists in the effective network selection list, an EHPLMN having the highest priority is selected for access. When no EHPLMN exists in the effective network selection list, the HPLMN is selected for access in priority order.

When no accessible network can be found in the EHPLMN and HPLMN, a network in a User Controlled PLMN Selector with Access Technology list is selected in priority order.

When no accessible network can be found in the User Controlled PLMN Selector with Access Technology list, a network in an Operator Controlled PLMN Selector with Access Technology list is selected in priority order.

Specifically, when the network selection is not PLMN selection, the reading the effective network selection lists indicated by the $EF_{UST}$ in the UICC in sequence to perform network selection may be as follows.

If a user controlled network selection list exists in the network selection list stored in the UICC and the user controlled network selection list is effective, a network in the user controlled network selection list is selected in priority order.

If no accessible network can be found in the user controlled network selection list, an operator controlled network selection list exists in the network selection list stored in the UICC, and the operator controlled network selection list is effective, a network in the operator controlled network selection list is selected in priority order.

(2) When no accessible network can be found by reading the network selection list stored in the UICC in sequence and the ME stores the network selection list in the DM tree of the ME, the ME reads the network selection list stored in the ME and selects a network in the network selection list stored in the ME in priority order. The selected network is not included in the forbidden list of the selection network.

(3) When no accessible network can be found in the network selection list stored in the ME, all other networks having a signal quality higher than a preset value are randomly selected, and the selected network is not included in the forbidden list of the selected network.

If still no accessible network can be found, all other networks are selected in a high-to-low signal quality sequence, and the selected network is not included in the forbidden list of the selected network.

In the method for network selection, network selection lists are stored in both the UICC and ME, so as to provide a method for network selection accomplished with the UICC and ME in cooperation. In the embodiment of the present invention, other network lists are added, and a method for network selection of the added network lists is provided. The method combines advantages of storing lists in the UICC and in the DM tree of the ME, so that the list update in the OTA mode becomes more convenient and the network selection based on the updated lists is more thorough and effective.

In a first embodiment of the present invention, the method for network selection in the case that a list related to network selection is stored in the terminal is illustrated.

Figure 2:
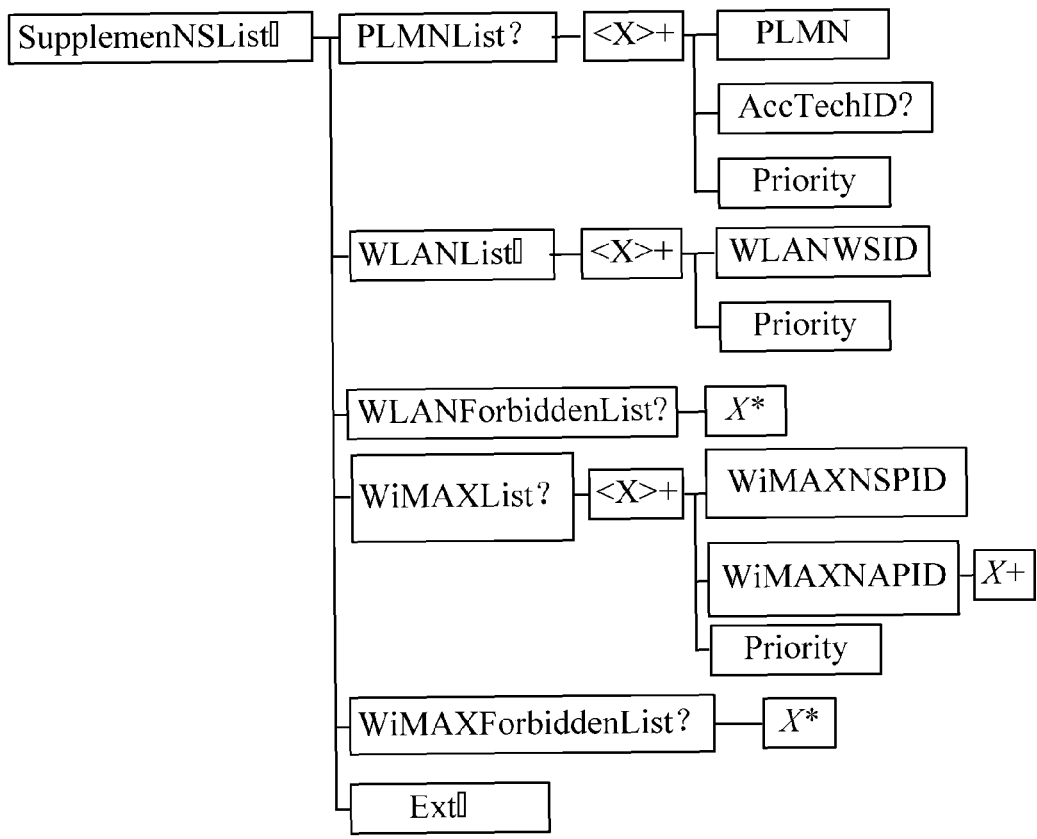
FIG. 2 is a schematic view of a data structure of a network selection list stored in an ME according to an embodiment of the present invention.

FIG. 2 is a schematic view of a data structure of a network selection list stored in an ME according to an embodiment of the present invention. The data structure may be configured and stored in a DM tree of a terminal (that is, the ME) as an MO or a part of the MO, and serves as a supplement to lists related to network selection stored in the UICC. One or more of a PLMNList, a WLANList, a WLANForbiddenList, a WiMAXList, and a WiMAXForbiddenList in the structure may be selected as required for structure reorganization, and a new list may be added as required for structure reorganization.

In the data structure, the PLMNList is a supplement to the PLMNList in the UICC. Some PLMNLists are configured in the UICC in advance at the network side, so as to enable a mobile phone to perform network selection initially. A PLMNList is provided so that new PLMN or newly subscribed PLMN can be added subsequently by an operator in the OTA mode, and is a supplement to the PLMNList in the UICC. The PLMNList may include multiple groups of sub-nodes, and each group may include three kinds of sub-nodes as follows.

PLMNList/<X>/PLMN: with a value of a mobile country code (MCC)+a mobile network code (MNC), for identifying a PLMN.

PLMNList/<X>/AccTechID: access technology identifier, for example, Universal Mobile Telecommunications System Territorial Radio Access Network (UTRAN) and Global System for Mobile communication (GSM).

PLMNList/<X>/Priority: priorities of PLMNs in the PLMNList.

In the data structure, the WLANList is mainly adapted to configure preferred WLAN access at the network side, and is also a supplement to the WLANList configured in the UICC. The WLANList may include multiple groups of sub-nodes, and each group may include two kinds of sub-nodes as follows.

WLANList/<X>/WSID: network identifier of a WLAN network.

WLANList/<X>/Priority: priorities of WLANs in the WLANList.

In the data structure, the WLANForbiddenList is used for indicating some forbidden WLANs configured at the network side, and may include multiple sub-nodes. Each sub-node represents a forbidden WLAN network, and a value of the sub-node is an identifier of a forbidden WLAN.

In the data structure, the WiMAXList is used for WiMAX access configured at the network side. The home WiMAX in the WiMAXList has the highest priority and may include multiple groups of sub-nodes, and each group may include three kinds of sub-nodes as follows.

WiMAXList/<X>/NSPID: WiMAX network provider identifier.

WiMAXList/<X>/NAPID: WiMAX network access point identifier.

WiMAXList/<X>/Priority: priorities of the WiMAX networks in the WiMAXList.

The WiMAXForbiddenList is used for some forbidden WiMAX configured at the network side, and may include a plurality of sub-nodes. Each sub-node represents a forbidden WiMAX network, and a value of the sub-node is a network provider identifier of a forbidden WiMAX.

In the data structure, the Ext is used for subsequent extension of the data structure.

The networks in the list can be selected. However, whether the network can be selected for access depends on whether a network access condition is satisfied, for example, whether a signal amount is sufficient, whether Quality of Service (QoS) is satisfied, and whether access authentication succeeds.

The data in the data structure may be configured and updated by using the following two methods.

In a first method, a network selection list is encapsulated in a Bootstrap message and the network selection list is configured in the DM tree of the ME when the DM client performs Bootstrap configuration. Specifically, the method may be as follows.

After being serialized, the data structure is encapsulated in a DM Bootstrap message in a Tree and Description Serialization (TNDS) format encoded with Wireless Application Protocol Binary Extensible Marked Language (WBXML). When the DM client performs DM Bootstrap configuration, the data structure is configured at the same time when the DM Account (DMAcc) MO is configured. The ACL with the configured data structure is assigned to a server corresponding to the DMAcc MO.

Figure 3:
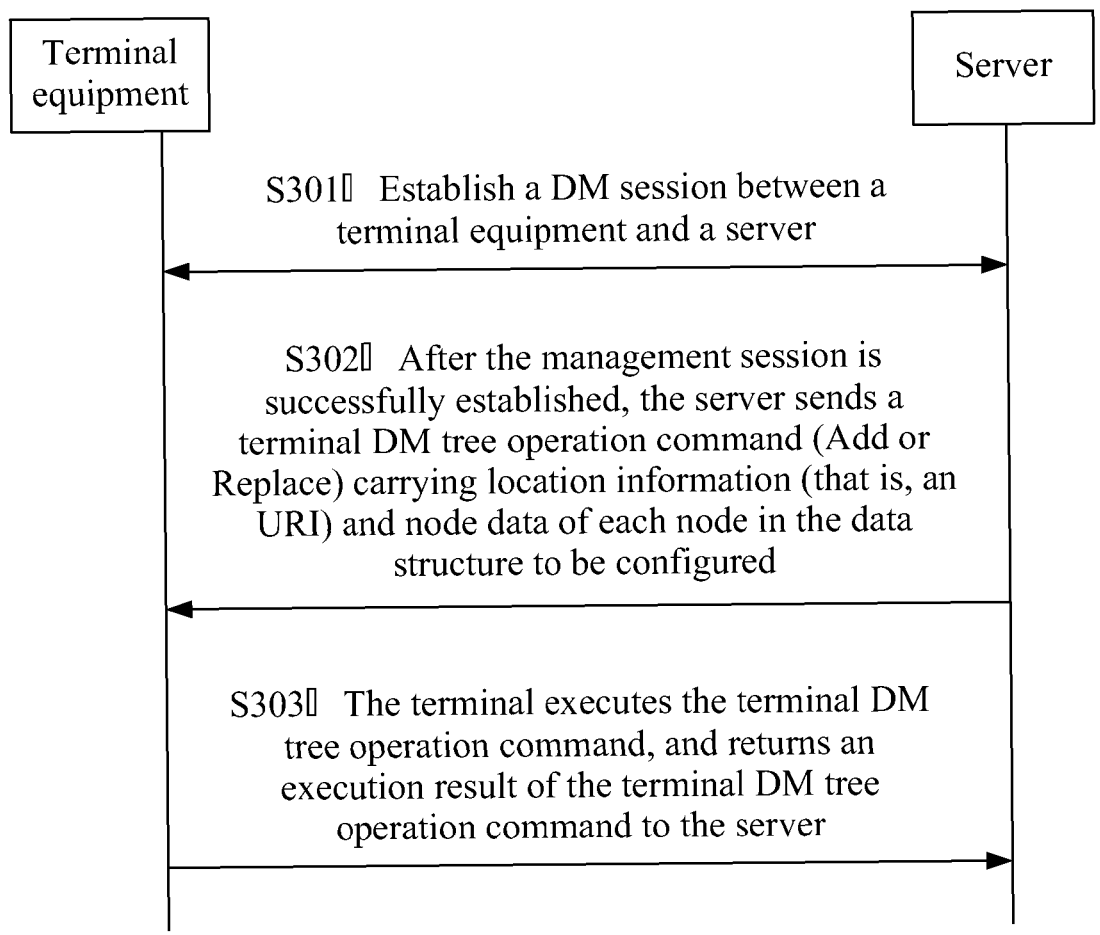
FIG. 3 is a flow chart of a method for configuring and updating data in a data structure according to an embodiment of the present invention.

In a second method, the network selection list is configured in the DM tree of the ME through a DM command sent in a DM session. In the second method, the data structure may be configured and may also be updated subsequently. As shown in FIG. 3, in the second method, the method for configuring and updating the data in the data structure specifically includes the following steps.

In step S301, a DM session is established between a terminal equipment and a server. When the data is configured, an initiator establishing the DM session is usually the server. Certainly, it is also possible that the terminal initiates the establishment of the DM session. A first message for establishing the management session (a request message) is generated and sent by the terminal. In the process of session establishment, identity authentication is performed for the two parties and the transport layer authentication or application layer authentication may be adopted.

In step S302, after the management session is successfully established, the server sends a terminal DM tree operation command (Add or Replace). The command carries location information (that is, URI) and node data of each node in the data structure to be configured.

In step S303, the terminal executes the terminal DM tree operation command, and returns an execution result of the terminal DM tree operation command to the server. If the server still has other operations, the DM session continues and other operations are delivered. Otherwise, an empty message packet is sent to the terminal to end the session.

Each node in the data structure configured by using the first and second methods is allocated with an ACL. The ACL is adapted to limit the DM server that subsequently updates the configuration data.

Figure 4:
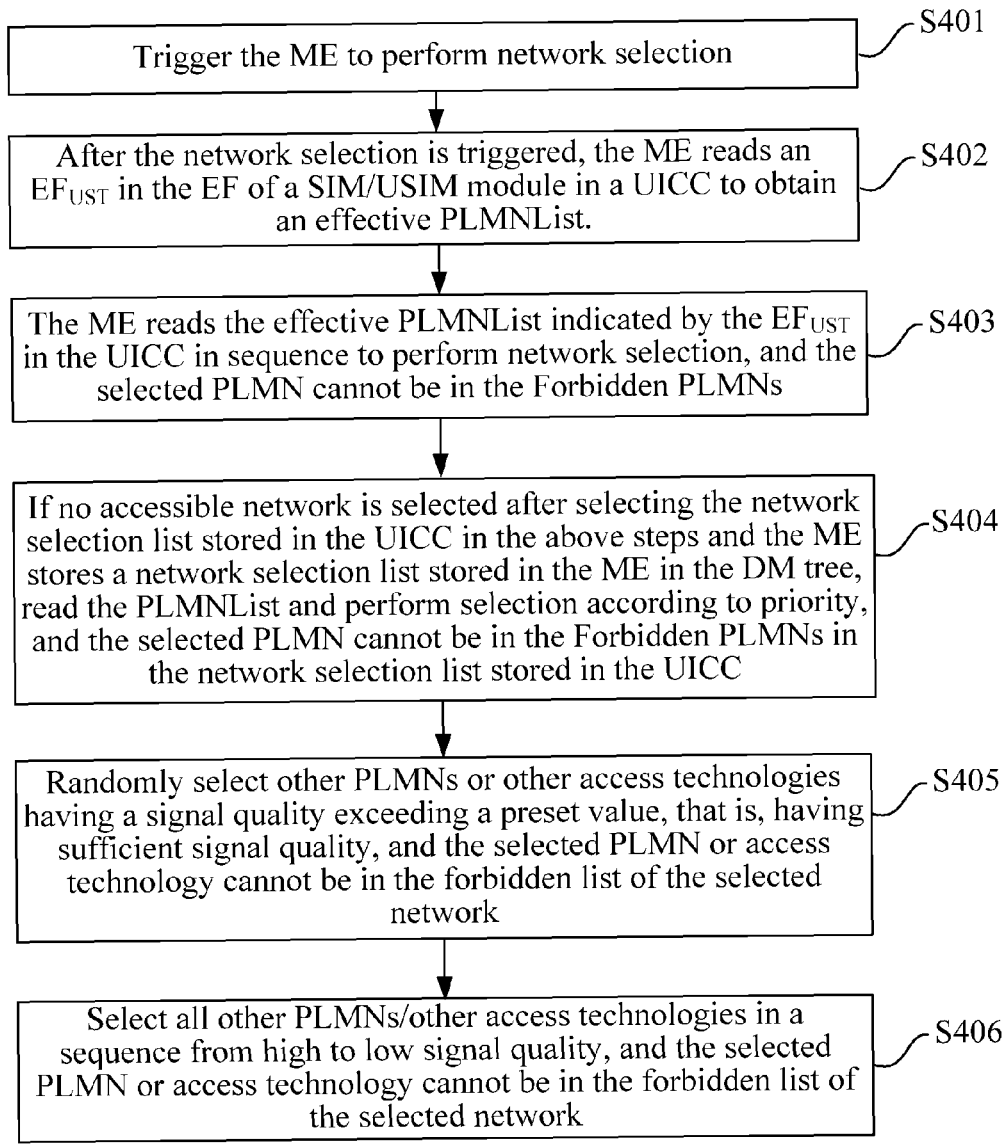
FIG. 4 is a flow chart of a method for automatic network selection in a PLMN according to an embodiment of the present invention.

The method for network selection after the data structure is added is described in the following. FIG. 4 is a flow chart of a method for automatic network selection in the PLMN. When the PLMN is manually selected, a sequence of presenting the PLMN to the user by the ME is also a sequence in the following process, and it is not described in detail here. Specifically, the process of the method for automatic network selection in the PLMN includes the following steps.

In step S401, the ME is triggered to perform network selection. A trigger condition that the ME performs network selection includes event trigger such as power-up, no signal, user trigger or timed trigger, and may also include other trigger conditions, such as network selection policy trigger.

In step S402, after the network selection is triggered, the ME reads the $EF_{UST}$ in the EF of a SIM/USIM module in a UICC to get an effective PLMNList.

In step S403, the ME reads the effective PLMNList indicated by the $EF_{UST}$ in the UICC in sequence to perform network selection. The selected PLMN cannot be in the Forbidden PLMNs. Specifically, the reading the effective PLMNList indicated by the $EF_{UST}$ in the UICC in sequence to perform network selection may be as follows.

If an EHPLMN exists, an EHPLMN having the highest priority is selected. Otherwise, an HPLMN is selected in priority order.

If no accessible network can be found in the EHPLMN and HPLMN, a PLMN in a User Controlled PLMN Selector with Access Technology list is selected in priority order.

If no accessible network can be found in the User Controlled PLMN Selector with Access Technology list, a PLMN in an Operator Controlled PLMN Selector with Access Technology list is selected in priority order.

In step S404, if no accessible network can be found after the selecting the network selection list stored in the UICC in the foregoing steps and the ME stores a network selection list in the DM tree, in step S404, a PLMNList, the PLMNList is read and selected according to priorities. The selected PLMN cannot be in the Forbidden PLMNs in the network selection list stored in the UICC. If still no accessible network can be found through step S404, step S405 is performed.

In step S405, other PLMNs or other access technologies having a signal quality higher than a preset value, that is, having sufficient signal quality are randomly selected. The selected PLMN or access technology cannot be in the forbidden list of the selected network, for example, in the Forbidden PLMNs. If still no accessible network can be found through step S405, step S406 is performed.

In step S406, all other PLMNs/other access technologies are selected in a sequence from high to low signal quality. The selected PLMN or access technology cannot be in the forbidden list of the selected network, for example, the Forbidden PLMNs.

Figure 5:
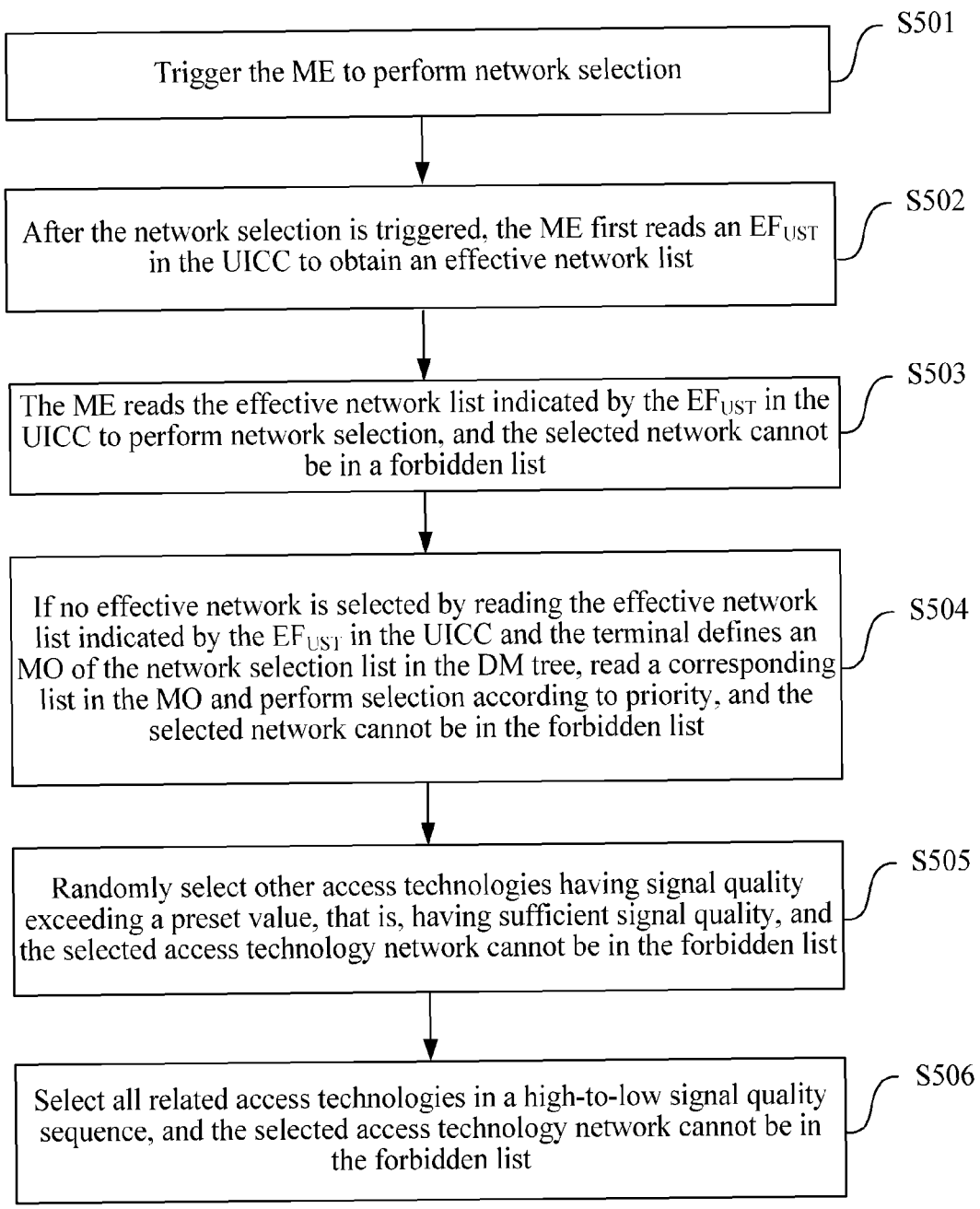
FIG. 5 is a flow chart of a method for automatic network selection in another access technology according to an embodiment of the present invention.

The method for automatic network selection in other access technologies (non-PLMN access technology such as WiMAX) is as shown in FIG. 5. During manual selection from other access technologies, a sequence presented to the user by the ME is also the sequence in the following process, and it is not described in detail here. Specifically, the process of the method for automatic network selection in other access technologies includes the following steps.

In step S501, the ME is triggered to perform network selection. The trigger condition for the ME to perform network selection may be a network selection policy or that a user triggers the ME to perform network selection.

In step S502, after the network selection is triggered, the ME first reads the $EF_{UST}$ in the UICC to obtain an effective network list.

In step S503, the ME reads the effective network list indicated by the $EF_{UST}$ in the UICC to perform network selection. The selected network cannot be in a forbidden list.

Specifically, the reading the effective network list indicated by the $EF_{UST}$ in the UICC to perform network selection may be as follows.

If a user controlled network selection list exists in the UICC and is effective, a network in the user controlled network selection list is selected in priority order.

If no accessible network can be found in the user controlled network selection list, an operator controlled network selection list exists in the UICC, and the operator controlled network selection list is effective, a network in the operator controlled network selection list is selected in priority order.

In step S504, if no effective network is selected by reading the effective network list indicated by the EFUST in the UICC and the terminal defines an MO of the network selection list in the DM tree, a corresponding list in the MO is read (if it is WLAN network selection, a WLANList and a WLANForbiddenList are read), and selection is made according to priorities. The selected network cannot be in the forbidden list. If still no accessible network can be found through step S504, step S505 is performed.

In step S505, other access technologies having signal quality higher than a preset value, that is, having sufficient signal quality are randomly selected. The selected access technology network cannot be in the forbidden list. If still no accessible network can be found through step S505, step S506 is performed.

In step S506, all related access technologies are selected in a sequence from high to low signal quality. The selected access technology network cannot be in the forbidden list.

In the method for network selection, primarily the UICC stores lists related to the network selection and secondarily the ME stores lists related to the network selection, so as to provide a method for network selection accomplished by the UICC and ME in cooperation, and provide designs of lists related to the network selection based on the DM protocol at the same time while maintaining the advantages of storing the network selection list in the UICC, so that the list update in the OTA mode becomes more convenient. Also, by supplementing effective network lists such as the WLAN and the WiMAX, the ME can perform network selection based on more lists, so that the network selection becomes more effective.

Figure 6:
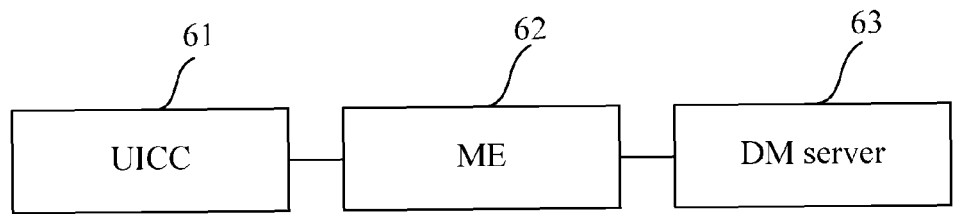
FIG. 6 is a structural view of a system for network selection according to an embodiment of the present invention.

FIG. 6 is a structural view of a system for network selection according to an embodiment of the present invention, where the system includes a UICC 61, an ME 62, and a DM server 63.

The UICC 61 is adapted to store an EF related to network selection.

The ME 62 is adapted to store a network selection list in a DM tree, communicate with the DM server 63 to configure and update the network selection list, read the network selection lists stored in the UICC 61 and ME 62 after the network selection is triggered, and perform network selection according to the stored network selection lists.

The DM server 63 is adapted to configure and update the network selection list stored in the ME 62 through a DM protocol.

Figure 7:
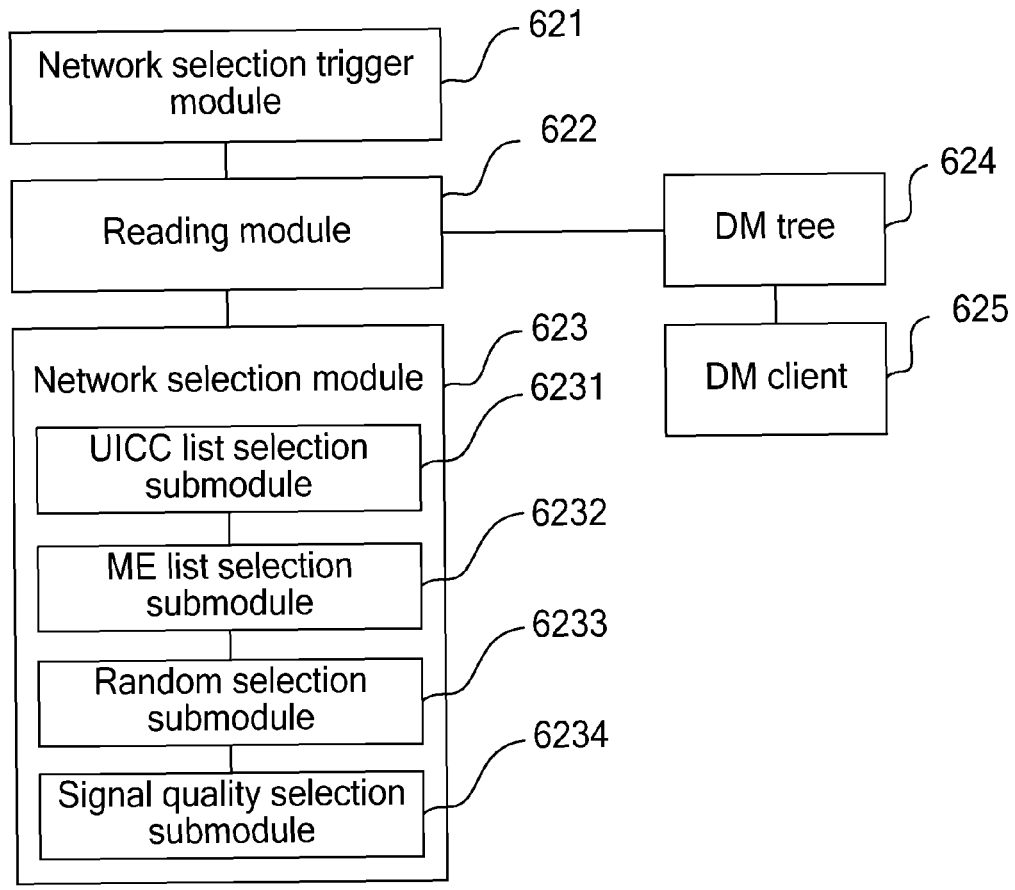
FIG. 7 is a structural view of an ME according to an embodiment of the present invention.

FIG. 7 is a structural view of an ME according to an embodiment of the present invention, where the ME includes a network selection trigger module 621, a reading module 622, and a network selection module 623.

The network selection trigger module 621 is adapted to trigger network selection after a network selection trigger condition is satisfied.

The reading module 622 is adapted to read network selection lists stored in a UICC 61 and an ME 62 after the network selection trigger module 621 triggers the network selection.

The network selection module 623 is adapted to perform network selection according to the network selection lists read by the reading module 622.

The ME 62 may further include a DM tree 624 and a DM client 625.

The DM tree 624 is adapted to store a network selection list.

The DM client 625 is adapted to configure the network selection list encapsulated in a Bootstrap message in a DM tree 624 of the ME 62 when performing Bootstrap configuration, or configure the network selection list in the DM tree 624 of the ME 62 through the DM session.

The network selection module 623 may include a UICC list selection submodule 6231.

The UICC list selection submodule 6231 is adapted to read an effective network selection list in the UICC 61 in sequence to perform network selection. The selected accessible network is not included in the forbidden list of the selected network.

The network selection module 623 may further include an ME list selection submodule 6232.

The ME list selection submodule 6232 is adapted to read a network selection list stored in the ME 62 when no accessible network can be found by the UICC list selection submodule 6231 and the network selection list is stored in the DM tree of the ME 62, and select an accessible network in the network selection list stored in the ME 62 according to network priorities. The selected accessible network is not included in the forbidden list of the selected network.

The network selection module 623 may further include a random selection submodule 6233 and a signal quality selection submodule 6234.

The random selection submodule 6233 is adapted to randomly select a network having signal quality higher than a preset value in the network selection list stored in the ME 62 as an accessible network when no accessible network can be found by the ME list selection submodule 6232. The selected network is not included in the forbidden list.

The signal quality selection submodule 6234 is adapted to select an accessible network in the network selection list stored in the ME 62 in a sequence from high to low signal quality when still no accessible network can be found by the random selection submodule 6233. The selected network is not included in the forbidden list.

For the ME 62, after the network selection trigger module 621 triggers the network selection, the reading module 622 reads the network selection lists stored in the UICC and ME, the network selection module 623 performs network selection according to the network selection lists read by the reading module 622, and effective network lists such as the WLAN and the WiMAX are added, so that the ME 62 can perform network selection based on more lists, so as to make the network selection more effective.

Figure 8:
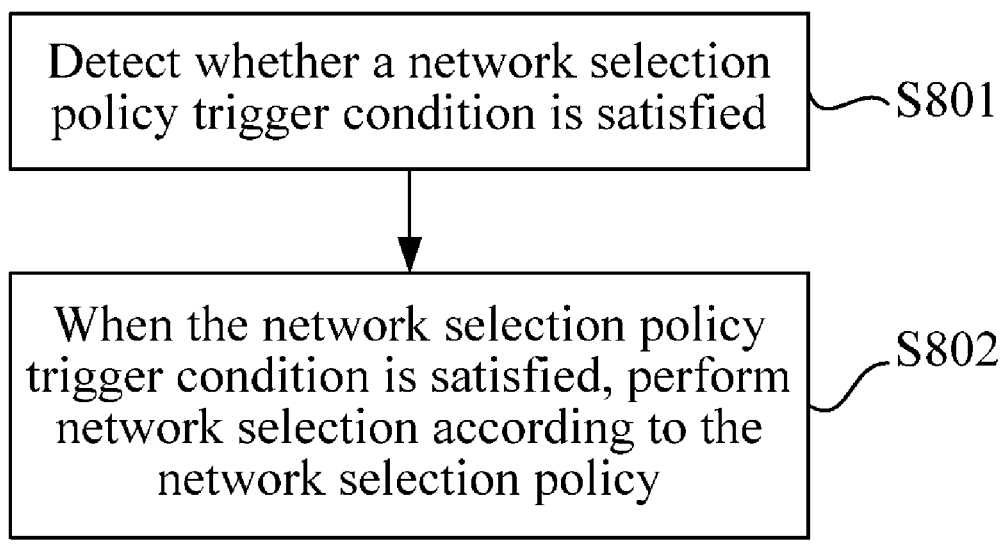
FIG. 8 is a flow chart of another method for network selection according to an embodiment of the present invention.

FIG. 8 is a flow chart of another method for network selection according to an embodiment of the present invention, where the method specifically includes the following steps.

In step S801, it is detected whether a network selection policy trigger condition is satisfied.

In an embodiment of the present invention, the network selection policy trigger condition is configured and stored in the DM tree of the ME, a network selection policy corresponding to the network selection policy trigger condition may further be configured, and the network selection policy is a preferred network or a preferred network type. The network selection policy trigger condition configured in the DM tree and the corresponding network selection policy may be configured and updated by a DM server having an operation right (through ACL attribute control of a node) through a DM protocol. For example, a Modify or Delete operation is performed on the network selection policy trigger condition and the network selection policy.

The network selection policy trigger condition includes one or more of service or service type trigger, network QoS trigger, optional network operation condition trigger, signal quality trigger, location trigger, context trigger, and service interrupt prevention.

The service or service type trigger may specifically include configuring a service or a service type in the ME, and may further include configuring a preferred network or preferred network type of the service or the service type. When the ME starts the configured service or the started service has a configured service type, the network selection is triggered.

The network QoS trigger specifically includes configuring minimum QoS requirement of a network in the ME. When the ME detects that the minimum QoS requirement exists in the current access network and the QoS of the current access network is lower than the minimum QoS requirement, the network selection is triggered.

Specifically, the optional network operation condition trigger includes configuring an operation condition of a specific network in the ME. When the specific network serves as a current access network, if the ME detects the operation condition, the network selection is triggered.

Specifically, the signal quality trigger includes configuring a signal quality threshold value and duration of a specific network in the ME. When the specific network serves as a current access network, if the ME detects that the signal quality of the current access network is lower than the signal quality threshold value and duration exceeds the configured duration, the network selection is triggered.

Specifically, the location trigger includes configuring a location of a base station in the ME. When the ME accesses the base station, the network selection is triggered.

The context trigger specifically includes configuring a network that the ME needs to scan in the ME. When the ME scans the network and the ME confirms that the scanned network satisfies an access condition, the ME accesses the network.

Specifically, the service interrupt prevention includes configuring indication information of whether to allow the ME to interrupt the current access service during automatic network selection in the ME.

In step S802, when the network selection policy trigger condition is satisfied, network selection is performed according to the network selection policy.

Specifically, the performing the network selection according to the network selection policy may be as follows.

When the network selection policy trigger condition is satisfied, it is determined whether a preferred network or a preferred network type is configured for the network selection policy trigger condition.

When the network selection policy trigger condition includes a preferred network, a preferred network is selected for access. If a plurality of preferred networks having different priorities is configured, the preferred networks are accessed in priority order. If a plurality of preferred networks is configured but no priority exists, a network is randomly selected for access.

Alternatively, when the network selection policy trigger condition includes a preferred network type, a network having the preferred network type is selected in priority order for access.

Alternatively, when the network selection policy trigger condition does not include the preferred network or the preferred network type, or no accessible network exists for the configured preferred network or preferred network type, the network selection list stored in the UICC is read to perform network selection, or the network selection list stored in the UICC and a network selection list stored in the DM tree of the ME are read to perform network selection.

When the network selection policy trigger condition is a service or service type trigger, if the preferred networks or preferred network types of the service or service type configured in the ME have the same priority, the ME selects to access one of the networks having the same priority or selects to access a plurality of networks having the same priority.

In addition, in an embodiment of the present invention, a node that protects the network selection policy trigger condition and the preferred network or preferred network type is further configured, so as to instruct the ME whether to allow a user to modify the network selection policy trigger condition and the preferred network or preferred network type.

In the method for network selection, implementation methods of the type and the data structure of the network selection policy as well as the method for network selection based on the network selection policy are provided, so that the network selection can be controlled more flexibly, the terminal can locate a target network faster, and time consumed for network selection is reduced.

In a second embodiment of the present invention, a method for network selection according to a network selection policy is illustrated. In the second embodiment, some network selection policies may be set at the network side to perform network selection more effectively. The network selection policies may include trigger conditions and preferred networks (or preferred network types).

The trigger condition may be one or more of multiple trigger conditions such as service (or service type) trigger, network QoS trigger, optional network operation condition trigger, signal quality trigger, location trigger, context trigger, and service interrupt prevention indication.

Figure 9:
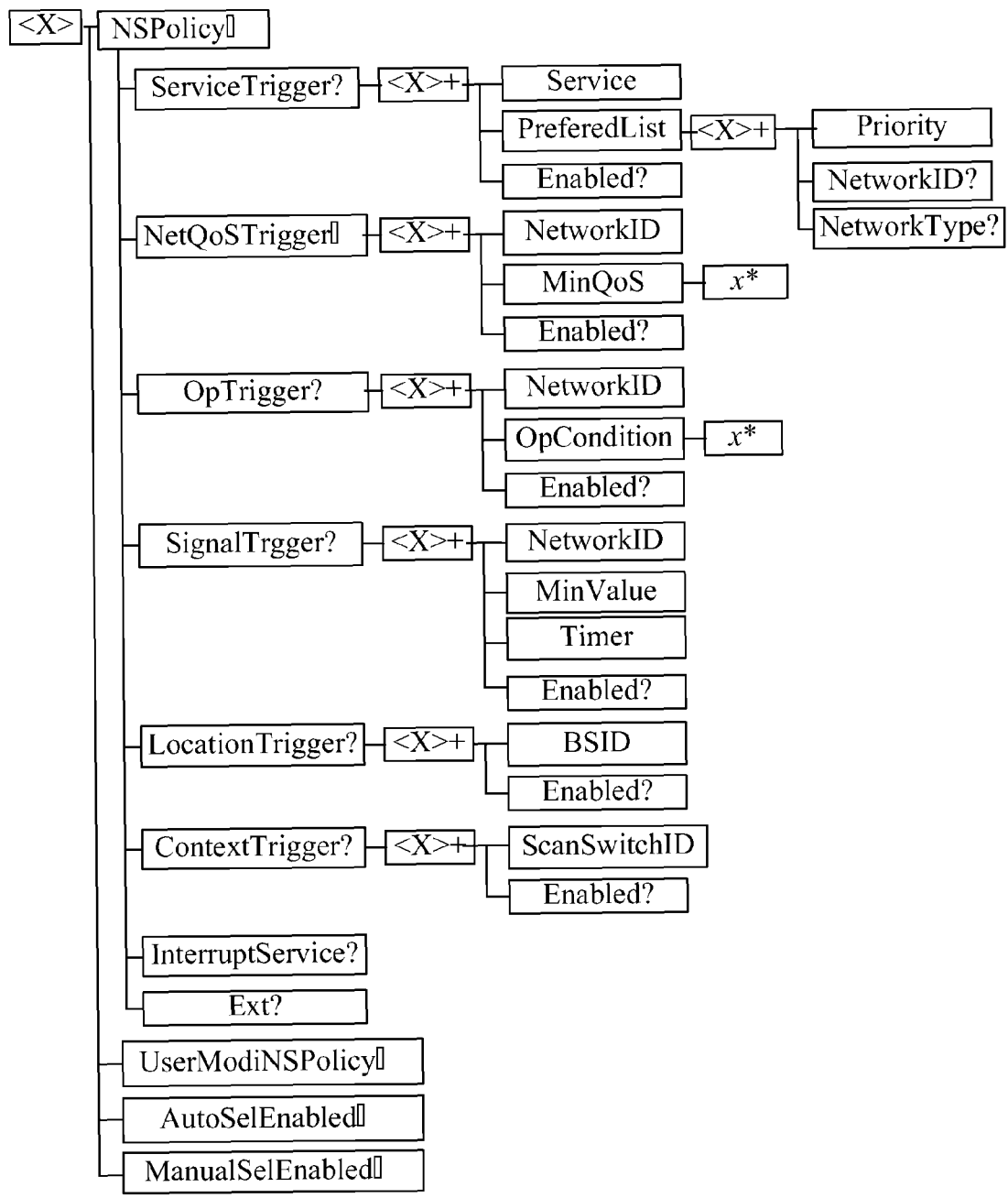
FIG. 9 is a schematic view of a data structure for implementing a network selection policy according to an embodiment of the present invention.

The data structure for implementing the network selection policy is as shown in FIG. 9. The data structure may be configured and stored in a DM tree of a terminal as an MO or a part of the MO. One or more of the trigger conditions such as the service (or service type) trigger, the network QoS trigger, the signal quality trigger, the location trigger, the context trigger, and the service interrupt prevention indication may be selected as required for structure reorganization. A new trigger condition may be further added as required for structure reorganization.

The data structure is described as follows.

The ServiceTrigger is service (or service type) trigger, which may include the following services or service types.

The ServiceTrigger/<X>/Service node indicates a specific service selected by a trigger network such as a download service, or a specific service type such as four service types defined by the 3rd Generation Partnership Project (3GPP) for the QoS. When the ME starts the service or the service started by the ME has a service type mentioned in the foregoing, the network selection is triggered.

The ServiceTrigger/<X>/PreferredList node and its sub-nodes configure a preferred network (NetworkID), a preferred network type (NetworkType), and its priority corresponding to the condition. A value of the preferred network type includes WLAN, WiMAX, 3GPP2, and General Packet Radio Service (GPRS). A plurality of preferred networks or preferred network types may have the same priority. If a plurality of preferred networks or preferred network types has the same priority, it indicates that one of the networks having the same priority or a plurality of networks having the same priority (that is, the service spans networks) can be selected at the same time to access the service.

The ServiceTrigger/<X>/Enabled node is adapted to control whether the network selection policy is effective. If the value of the node is True or the node does not appear, the ME considers that the network selection policy is effective. If the value of the node is False, the ME considers that the network selection policy is ineffective. The functions and values of the Enabled nodes in the following trigger conditions are similar to this node, and they are not described again here.

The NetQoSTrigger is network QoS trigger. Different QoSs are defined for different network layers. The QoS here means the network QoS, and its sub-node NetQoSTrigger/<X>/NetworkID indicates a specific network, and NetQoSTrigger/<X>/MinQoS is minimum QoS requirement of the specific network. The QoS has a plurality of parameters configured in the NetQoSTrigger/<X>/MinQoS/*node. The specific parameters are described in standard definitions of corresponding networks. When the ME confirms that the specific network serves as a current access network, if the current network QoS is lower than the minimum QoS requirement (when a certain parameter in the QoS parameter system is lower than a value configured for the corresponding MinQoS\*node, it is considered that the current network QoS is lower than the minimum QoS requirement), the network selection is triggered. No preferred network exists in the node, so that after the network selection is triggered, the ME reads the network selection list stored in the UICC to perform network selection, or reads network selection lists stored in the UICC and in the DM tree of the ME to perform network selection.

The OpTrigger is optional network operation condition trigger, and its sub-node OpTrigger/<X>/NetworkID is a network identifier indicating a specific network, and OpTrigger/<X>/OpCondition is some operation conditions defined for the specific network, that is, use conditions of the network defined by the network operator, for example, an error condition. A plurality of operation conditions may exist, and specific conditions are defined in the OpTrigger/<X>/OpCondition/* node. When the ME confirms that the specific network serves as a current access network, if the condition appears, the network selection is triggered. No preferred network exists in the node, so that after the network selection is triggered, the ME reads the network selection list stored in the UICC to perform network selection, or reads the network selection list stored in the UICC and a network selection list stored in the DM tree of the ME to perform network selection.

The SignalTrigger is signal quality trigger, and its sub-node SignalTrigger/<X>/NetworkID is a network identifier indicating a specific network, SignalTrigger/<X>/MinValue is minimum signal quality allowed by the network, and SignalTrigger/<X>/Timer is duration. When the ME confirms that the specific network serves as a current access network, if the current network signal quality is lower than the minimum signal quality and lasts for the time indicated by the Timer node, the network selection is triggered. No preferred network exists in the node, so that after the network selection is triggered, the ME reads the network selection list stored in the UICC to perform network selection, or reads the network selection list stored in the UICC and a network selection list stored in the DM tree of the ME to perform network selection. In addition, in order to prevent collision between no signal event in the event trigger and the trigger condition, when no signal exists in the network, the situation is processed as event trigger.

The LocationTrigger is location trigger, and its sub-node LocationTrigger/<X>/BSID is a base station identifier indicating a certain base station. When the ME enters the coverage of the base station, the network selection is triggered. No preferred network exists in the node, so that after the network selection is triggered, the ME reads the network selection list stored in the UICC to perform network selection, or reads the network selection list stored in the UICC and a network selection list stored in the DM tree of the ME to perform network selection.

The ContextTrigger is context trigger, and its sub-node ContextTrigger/<X>/ScanSwitchID is an identifier of a certain network. The network selection policy instructs the ME to scan and access the network indicated by the identifier. That is, the ME scans the network indicated by the identifier, and the indicated network may be a WLAN. Preferably, the ME performs timed scanning on the network indicated by the identifier. When the ME scans the network, after determining that the conditions such as the signal quality satisfy the access, the ME attempts to access the network. Therefore, the sub-node may be a trigger condition for scanning the network and the indication information that instructs the ME to access the network.

The InterruptService is service interrupt prevention indication. When a value of the node is True, the ME determines whether a service is being used before the network selection is triggered. If a service is being used, the ME determines whether network handover causes service interrupt during the network selection (that is, whether the service has service continuity capability between the current network and the network to which the ME is to be handed over). If it is confirmed that the network handover causes service interrupt, the network handover is aborted. If the value of the node is False or the node does not appear, the ME performs normal network handover. In the process, the network side only informs the ME of whether the network selection can be interrupted, and the ME specifically determines which network handover will cause the interrupt of which services.

In order to protect the network selection policy from unauthorized modification, a UserModiNSPolicy node is further designed in the data structure. The network side controls whether a user can modify network selection policies set at the network side through the node, and the control is specifically as follows. If a value of the node is True, the user can modify the network selection policies through a user interface of the ME. If the value of the node is False, the user is unable to modify the network selection policies.

In order to flexibly control automatic network selection by the ME and manual network selection by the user at the network side, two nodes may be further added in the network selection policy to control the network selection modes. A node that controls automatic network selection is AutoSelEnabled, and if a value thereof is True, the ME is allowed to perform automatic network selection; if the value is False, the ME is not allowed to perform automatic network selection. A node that controls manual selection is ManualSelEnabled, and if a value thereof is True, the user is allowed to perform manual network selection; if the value is False, the user is not allowed to perform manual network selection.

Thresholds may further be added for some network trigger policies in the data structure. The network trigger policy may be NetQoSTrigger, SignalTrigger, and LocationTrigger, so as to prevent the network selection operation from being frequently triggered when a practical value fluctuates near the trigger value of the network trigger policy. Taking the SignalTrigger as an example, the MinValue is an accurate value, so that a practical value of the network might probably fluctuate near the value (either a little higher or a little lower), thus causing frequent handover between networks. In order to avoid this problem, a Threshold node may be added in the SignalTrigger/<X> and the node value is a fluctuating range. Therefore, the network selection is triggered when a practical signal of the network weakens and becomes lower than the MinValue-Threshold, or the network selection is triggered when the practical signal of the network becomes stronger and higher than the MinValue+Threshold. Thus, frequent handover between networks can be effectively avoided. Other network selection policies are similar to the above description.

The method for configuring and updating the data structure is the same as those in the first embodiment, and is not described again here.

Figure 10A:
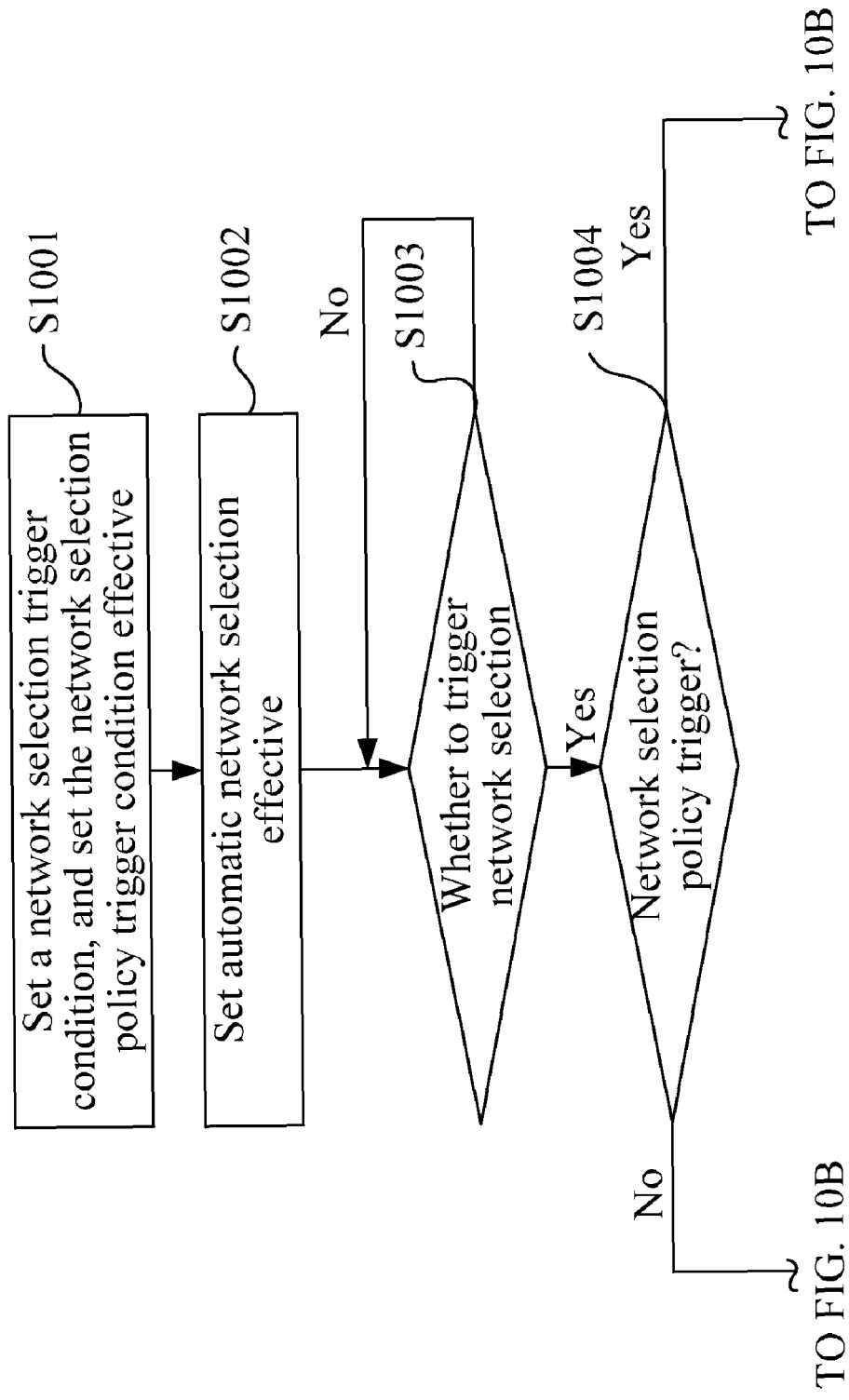
FIGS. 10A and 10B are a flow chart of a method for network selection based on a network selection policy according to an embodiment of the present invention.
Figure 10B:
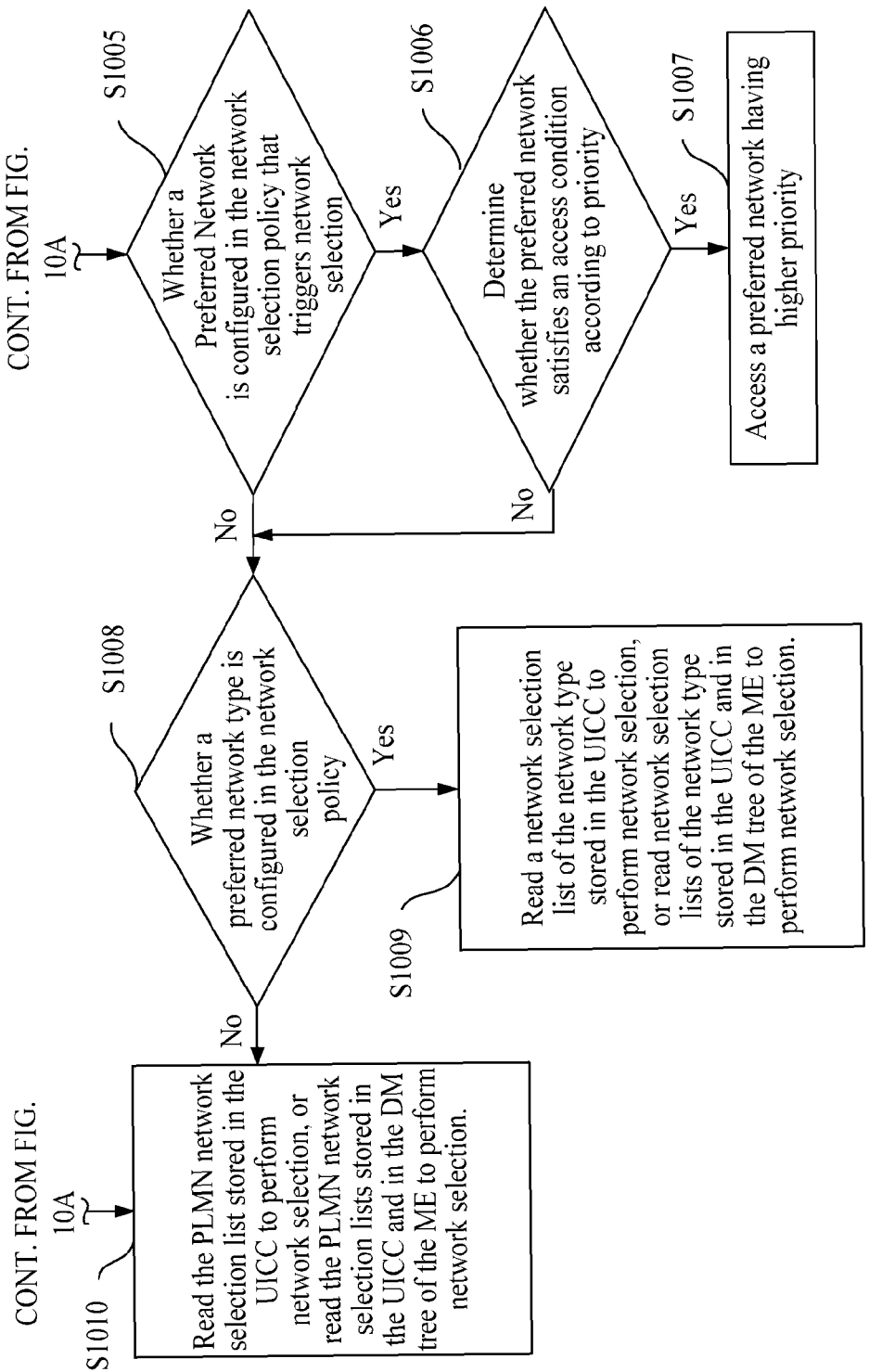

FIG. 10 is a flow chart of a method for network selection based on a network selection policy according to a second embodiment of the present invention, and specifically, the method includes the following steps.

In step S1001, a network selection trigger condition is set. The network selection trigger condition includes an event trigger condition and a network selection policy trigger condition, and the network selection policy trigger condition is set effective.

In step S1002, automatic network selection is set effective.

In step S1003, it is determined whether to trigger the network selection. If yes, step S1004 is performed. Otherwise, continue to perform step S1003.

In step S1004, it is determined whether the network selection policy trigger is performed. If yes, step S1005 is performed. If it is event trigger such as power-up, no signal, user trigger network selection, and timed trigger, step S1010 is performed.

In step S1005, it is determined whether a preferred network is configured for the network selection policy that triggers network selection. If the preferred network is configured, step S1006 is performed. If no preferred network is configured for the network selection policy, step S1008 is performed.

In step S1006, it is determined whether the preferred network satisfies an access condition according to priority. If a network that satisfies the access condition exists, step S1007 is performed. If no network satisfying the access condition exists, step S1008 is performed.

In step S1007, a preferred network having higher priority is accessed.

In step S1008, it is determined whether a preferred network type is configured for the network selection policy that triggers network selection. If the preferred network type is configured, step S1009 is performed. Otherwise, step S1010 is performed.

In step S1009, the ME reads a network selection list of the network type stored in the UICC to perform network selection, or reads network selection lists of the network type stored in the UICC and in the DM tree of the ME to perform network selection.

In step S1010, the ME reads the PLMN network selection list stored in the UICC to perform network selection, or reads the PLMN network selection lists stored in the UICC and in the DM tree of the ME to perform network selection.

In the method for network selection, the network selection policy is adapted to perform network selection, so that the network selection can be controlled more flexibly, the terminal can locate a target network faster, and time consumed for network selection is reduced.

Figure 11:
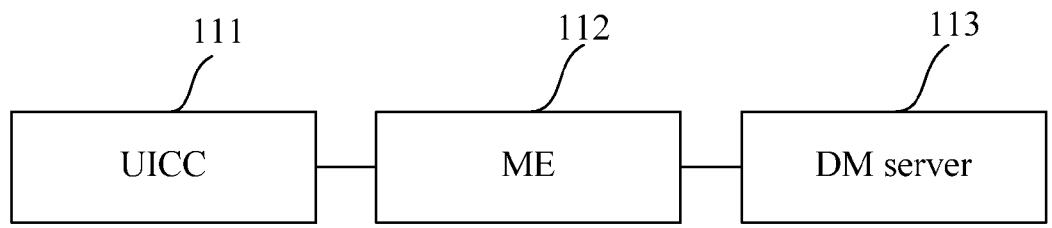
FIG. 11 is a structural view of a system for network selection according to an embodiment of the present invention.

FIG. 11 is a structural view of a system for network selection according to an embodiment of the present invention, which includes a UICC 111, an ME 112, and a DM server 113.

The UICC 111 is adapted to store an EF related to network selection.

The ME 112 is adapted to perform network selection according to a network selection policy when detecting that a network selection policy trigger condition is satisfied.

The performing network selection according to the network selection policy specifically includes the following steps.

After the network selection policy trigger condition is satisfied, it is determined whether the network selection policy includes a preferred network or a preferred network type.

When the network selection policy includes the preferred network, a preferred network is selected for access. If a plurality of preferred networks with different priorities is configured, the preferred networks are accessed in priority order. If a plurality of preferred networks is configured but no priority exists among them, the networks are randomly selected for access.

Alternatively, when the network selection policy includes the preferred network type, a network of the preferred network type is selected in priority order for access.

Alternatively, when the network selection policy does not include the preferred network or preferred network type, or no accessible network exists for the configured preferred network or preferred network type, a network selection list stored in the UICC is read to perform network selection, or the network selection list stored in the UICC and a network selection list stored in the DM tree of the ME are read to perform network selection.

When the network selection policy trigger condition is a service or service type trigger, if the preferred networks or preferred network types of the service or service types configured in the ME have the same priority, the ME selects to access one of the networks having the same priority or selects a plurality of networks having the same priority.

The DM server 113 is adapted to configure and update the network selection policy trigger condition and a corresponding network selection policy through a DM protocol.

Figure 12:
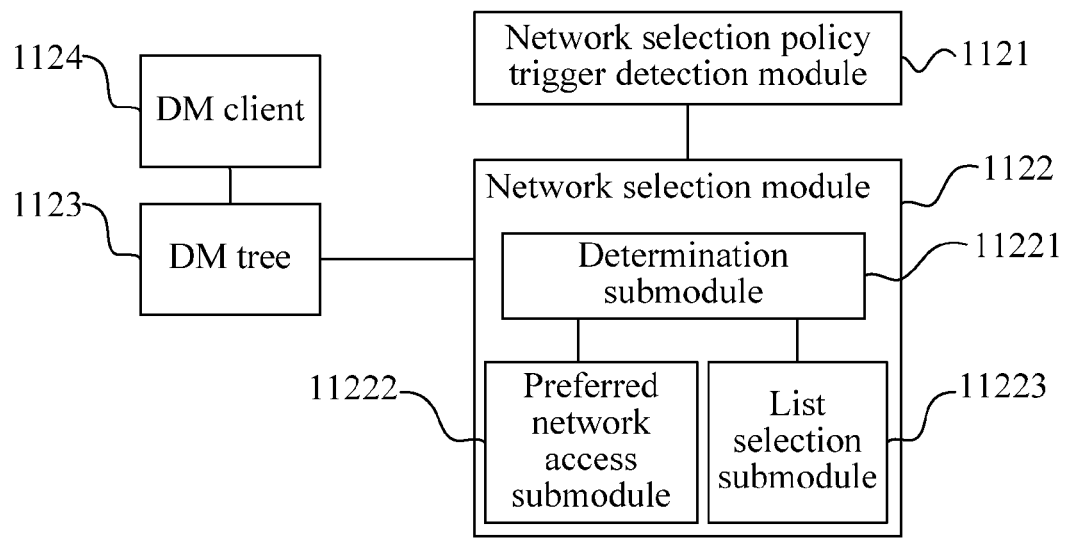
FIG. 12 is a structural view of an ME according to an embodiment of the present invention.

FIG. 12 is a structural view of an ME according to an embodiment of the present invention, where the ME includes a network selection policy trigger detection module 1121 and a network selection module 1122.

The network selection policy trigger detection module 1121 is adapted to detect whether a network selection policy trigger condition is satisfied, and trigger network selection when the network selection policy trigger condition is satisfied.

The network selection module 1122 is adapted to perform network selection according to the network selection policy after the network selection policy trigger detection module 1121 triggers network selection.

Alternatively, when no network is selected according to the network selection policy, a network selection list stored in the UICC is read to perform network selection, or the network selection list stored in the UICC and a network selection list stored in the ME are read to perform network selection.

The ME 112 may further include a DM tree 1123 and a DM client 1124.

The DM tree 1123 is adapted to store a network selection policy trigger condition and a corresponding preferred network or preferred network type.

The DM client 1124 is adapted to communicate with the DM server 113, and configure and store the network selection policy trigger condition and the corresponding preferred network or preferred network type in the DM tree 1123 of the ME 112.

The network selection module 1122 may include a determination submodule 11221 and a preferred network access submodule 11222.

The determination submodule 11221 is adapted to determine whether the network selection policy includes the preferred network or preferred network type when the network selection policy trigger condition is satisfied.

The preferred network access submodule 11222 is adapted to select a preferred network having higher priority for access according to priority of the preferred network when the determination submodule 11221 determines that a network selection policy includes a preferred network, or select a network in the preferred network type in priority order for access when the determination submodule 11221 determines that the network selection policy trigger condition includes the preferred network type.

The network selection module 1122 may further include a list selection submodule 11223.

The list selection submodule 11223 is adapted to read a network selection list stored in the UICC to perform network selection, or read the network selection list stored in the UICC and a network selection list stored in the DM tree of the ME to perform network selection when the preferred network access submodule 11222 fails to select a network according to the network selection policy.

In the method for network selection, a method for network selection based on a network selection policy is added, and implementation methods of a type of the network selection policy and a data structure of the network selection policy as well as a method for network selection based on the network selection policy are provided, so that the network selection can be controlled more flexibly, the terminal can locate a target network faster, and time consumed for network selection is reduced.

Through the descriptions of the preceding embodiments, those skilled in the art may understand that the present invention may be implemented by using hardware only or by using software and a necessary universal hardware platform. Based on such understandings, the technical solution under the present invention may be embodied in the form of a software product. The software product may be stored in a nonvolatile storage medium, and it may be a Compact Disk Read-Only Memory (CD-ROM), Universal Serial Bus (USB) flash drive, or a removable hard drive. The software product includes a number of instructions that enable a computer device (personal computer, server, or network device) to execute the methods provided in the embodiments of the present invention.

It is understandable to those skilled in the art that the accompanying drawings are for illustrating the embodiments only, and the modules or processes in the accompanying drawings are not mandatory.

In addition, the modules in the apparatus in the embodiments of the present invention may be distributed in the way described herein, or distributed in other ways, for example, in one or more other apparatuses. The modules in the foregoing embodiments may be combined into one, or split into several submodules.

The serial number of the embodiments given above is for clear description only, and does not indicate any order of preference.

The above descriptions are merely some exemplary embodiments of the present invention, but not intended to limit the scope of the present invention. Any modifications or variations that can be derived by those skilled in the art should fall within the scope of the present invention.

What is claimed is:

1. A method for network selection, the method comprising:
after network selection is triggered, reading a network selection list stored in a Universal Integrated Circuit Card (UICC) and a network selection list stored in a mobile equipment (ME), wherein the UICC is embedded in the ME and accessible by the ME, wherein the network selection list stored in the ME is stored in a device management (DM) tree of the ME, and wherein the network selection list in the DM tree of the ME is configured through a DM command sent in a DM session; and
performing network selection according to the network selection list stored in the UICC and the network selection list stored in the ME; wherein the triggered network selection is a PLMN selection, and performing network selection comprises: attempting to select a PLMN network from the network selection list stored in the UICC; and when no PLMN network is selected from the network selection list stored in the UICC, selecting a PLMN network in the network selection list stored in the ME.

2. The method for network selection according to claim 1, wherein the network selection list stored in the ME comprises one or more of a priority-based Public Land Mobile Network list (PLMNList), a priority-based Wireless Local Area Network list (WLANList), a priority-based World Interoperability for Microwave Access list (WiMAXList), a WLANForbiddenList, and a WiMAXForbiddenList.

3. The method for network selection according to claim 1, wherein an order of selecting the PLMN network in the network selection list stored in the UICC is from an Equivalent Home Public Land Mobile Network (EHPLMN), to a Home Public Land Mobile Network (HPLMN), to a network in a User Controlled PLMN Selector with Access Technology list, to a network in an Operator Controlled PLMN Selector with Access Technology list.

4. A mobile equipment (ME), comprising:
a network selection trigger module configured to trigger network selection;
a reading module configured to read a network selection list stored in a Universal Integrated Circuit Card (UICC) and a network selection list stored in the ME after the network selection trigger module triggers network selection;
a device management (DM) tree configured to store the network selection list stored in the ME;
a DM client configured to configure the network selection list stored in the DM tree through a DM command sent in a DM session; and
a network selection module configured to perform network selection according to the network selection lists read by the reading module; wherein the network selection module comprises: a UICC list selection submodule configured to read the network selection list stored in the UICC to perform network selection; and an ME list selection submodule configured to read the network selection list stored in the ME to select an accessible network when the UICC list selection submodule fails to select an accessible network.

* * * * *